United States Patent
Fleytman et al.

(10) Patent No.: US 6,402,652 B1
(45) Date of Patent: Jun. 11, 2002

(54) CONTINUOUSLY VARIABLE FOUR-WHEEL DRIVE TRANSMISSION WITH TRACTION CONTROL

(75) Inventors: Yakov Fleytman, Orion; Charles E. Beyer, Rochester; Philip J. Francis, Lapeer, all of MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/686,562

(22) Filed: Oct. 11, 2000

Related U.S. Application Data

(60) Provisional application No. 60/159,890, filed on Oct. 15, 1999.

(51) Int. Cl.[7] .................................................. F16H 3/72
(52) U.S. Cl. ............................... 475/5; 475/7; 475/150; 150/248
(58) Field of Search ............................... 475/5, 7, 150, 475/151, 153, 201, 204, 210, 211, 212, 218; 74/665 GE; 180/247, 248

(56) References Cited

U.S. PATENT DOCUMENTS

| | | | |
|---|---|---|---|
| 548,860 A | 10/1895 | Ames | |
| 1,903,318 A | 4/1933 | Wildhaber | |
| 1,980,237 A | 11/1934 | Trbojevich | |
| 3,220,284 A | 11/1965 | Horvath | |

(List continued on next page.)

FOREIGN PATENT DOCUMENTS

| | | | |
|---|---|---|---|
| DE | 2415859 | 10/1975 | |
| DE | 3435219 A1 | 5/1985 | |
| DE | 3428865 C1 | 9/1985 | |
| JP | 404087837 | * 3/1992 | ............ 180/247 X |
| JP | 405077651 | * 3/1993 | ................ 180/247 |

Primary Examiner—Charles A Marmor
Assistant Examiner—Ha Ho
(74) Attorney, Agent, or Firm—Harness, Dickey & Pierce P.L.C.

(57) ABSTRACT

A four-wheel drive transmission is provided which combines a continuously variable transmission unit and a transfer case into a common assembly. The four-wheel drive transmission includes a continuously variable transmission unit, a continuously variable range unit and a torque transfer unit. Variable speed control of a first worm/worm gear transmission drives a component of an epicyclic gearset associated with the continuously variable transmission unit to provide continuous ratio control between an input shaft and an intermediate shaft. Likewise, variable speed control of a second worm/worm gear transmission drives a component of a differential associated with the continuously variable range unit to provide continuous ratio control between the intermediate shaft and a first output shaft. Finally, the torque transfer unit controls the selective/automatic transfer of drive torque from one of the intermediate shaft and the first output shaft to a second output shaft to provide front-wheel drive.

4 Claims, 14 Drawing Sheets

U.S. PATENT DOCUMENTS

| | | |
|---|---|---|
| 3,535,948 A | 10/1970 | Winzeler |
| 3,597,990 A | 8/1971 | McCartin |
| 3,711,910 A | 1/1973 | Strejc |
| 3,777,837 A * | 12/1973 | Harper ........................ 180/11 |
| 3,875,635 A | 4/1975 | Pavlov et al. |
| 3,895,700 A | 7/1975 | Kerr |
| 3,949,626 A * | 4/1976 | Berlinger et al. .............. 475/7 |
| 3,977,632 A | 8/1976 | Walson |
| 4,047,449 A | 9/1977 | Popov |
| 4,457,394 A * | 7/1984 | Suzuli ........................ 180/247 |
| 4,489,625 A | 12/1984 | White |
| 4,632,337 A | 12/1986 | Moore |
| 4,685,346 A | 8/1987 | Brackett |
| 4,697,476 A | 10/1987 | Maxwell |
| 4,783,023 A | 11/1988 | Jupe |
| 4,813,297 A * | 3/1989 | Azuma et al. .......... 180/248 X |
| 4,907,672 A | 3/1990 | Muzzarelli |
| 4,973,295 A | 11/1990 | Lee |
| 4,998,385 A | 3/1991 | Umezono et al. |
| 5,015,898 A | 5/1991 | Frey |
| 5,018,403 A | 5/1991 | Umezono et al. |
| 5,033,996 A | 7/1991 | Frey |
| 5,081,885 A | 1/1992 | Shaffer |
| 5,226,860 A * | 7/1993 | Baxter et al. ........... 180/247 X |
| 5,265,488 A | 11/1993 | Yang |
| 5,353,889 A | 10/1994 | Hamada |
| 5,647,790 A | 7/1997 | Horiutchi |
| 5,988,006 A | 11/1999 | Fleytman |
| 5,992,259 A | 11/1999 | Fleytman |
| 6,074,322 A | 6/2000 | Fleytman |
| 6,093,126 A | 7/2000 | Fleytman |
| 6,098,480 A | 8/2000 | Fleytman |
| 6,148,683 A | 11/2000 | Fleytman |

\* cited by examiner

CONTINUOUSLY VARIABLE FOUR-WHEEL DRIVE TRANSMISSION WITH TRACTION CONTROL

This application claims the benefit of provisional application Ser. No. 60/159,890 filed Oct. 15, 1999.

FIELD OF THE INVENTION

The present invention relates generally to vehicle powertrains, and more particularly, to a front-wheel drive transmission which integrates a continuously variable transmission and a four-wheel drive transfer case into a common assembly.

BACKGROUND OF THE INVENTION

In general, power transfer mechanisms, such as transfer cases, are operatively coupled to both manual and automatic transmissions for selectively directing the power to the non-driven wheels of a motor vehicle for establishing four-wheel drive modes. Many automotive transfer cases are equipped with a speed reduction gear assembly for providing "high" and "low" speed ranges in conjunction with two and four-wheel drive modes. As such, a range shift mechanism is provided for operatively shifting components of the speed reduction gear assembly between a high range position providing a direct ratio drive connection and a low range position providing a reduction ratio drive connection.

Conventionally, transfer cases are provided in combination with standard automatic and manual transmissions. However, conventional automatic and manual transmissions are heavy and contribute greatly to the weight of the vehicle and are only capable of establishing discrete gear ratios. Furthermore, automatic transmissions are inefficient due to the requirement that the hydraulic system utilized for controlling the shifting of the automatic transmissions require a large amount of power in order to maintain the hydraulic fluid pressure even when shifting is not necessary.

Accordingly, it is desirable in the art of automotive transmissions to provide a combined transmission and transfer case which has improved efficiency, continuously variable operating ranges, and reduced size and weight.

SUMMARY OF THE INVENTION

Accordingly, it is an object of the present invention to provide a four-wheel drive transmission which combines a transmission section and a transfer case unit into a common assembly.

It is another object of the present invention to provide a four-wheel drive transmission which is lighter in weight and more compact than conventional transmission and transfer case combinations.

It is still another object of the present invention to provide a front-wheel drive transmission which does not require an engine clutch.

These and other objects of the present invention are obtained by providing; a four-wheel drive transmission having a continuously variable transmission unit a, a continuously variable range unit, and a torque transfer unit integrated into a common assembly. Both the transmission unit and the range unit are equipped with a worm/worm gear transmission which are controlled by a transmission controller to provide continuous control of the transmission unit and the range unit.

Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmissions of the present invention utilize a worm gear without undercut gear teeth because of a greater enveloping angle for one revolution of the worm thread. With less than twenty-four gear teeth and a greater enveloping angle for one revolution of the thread, as compared to prior enveloping worm/worm gear transmissions, the minimum ratio for one thread can be reduced to two, with an increased in efficiency. In contrast, prior enveloping worm/worm gear transmissions had a minimum ratio of twenty-four for one thread of the worm. The efficiency of the new worm/worm gear transmission is even greater than that of well-known hypoid gearsets which are used in low ratio right angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 24:
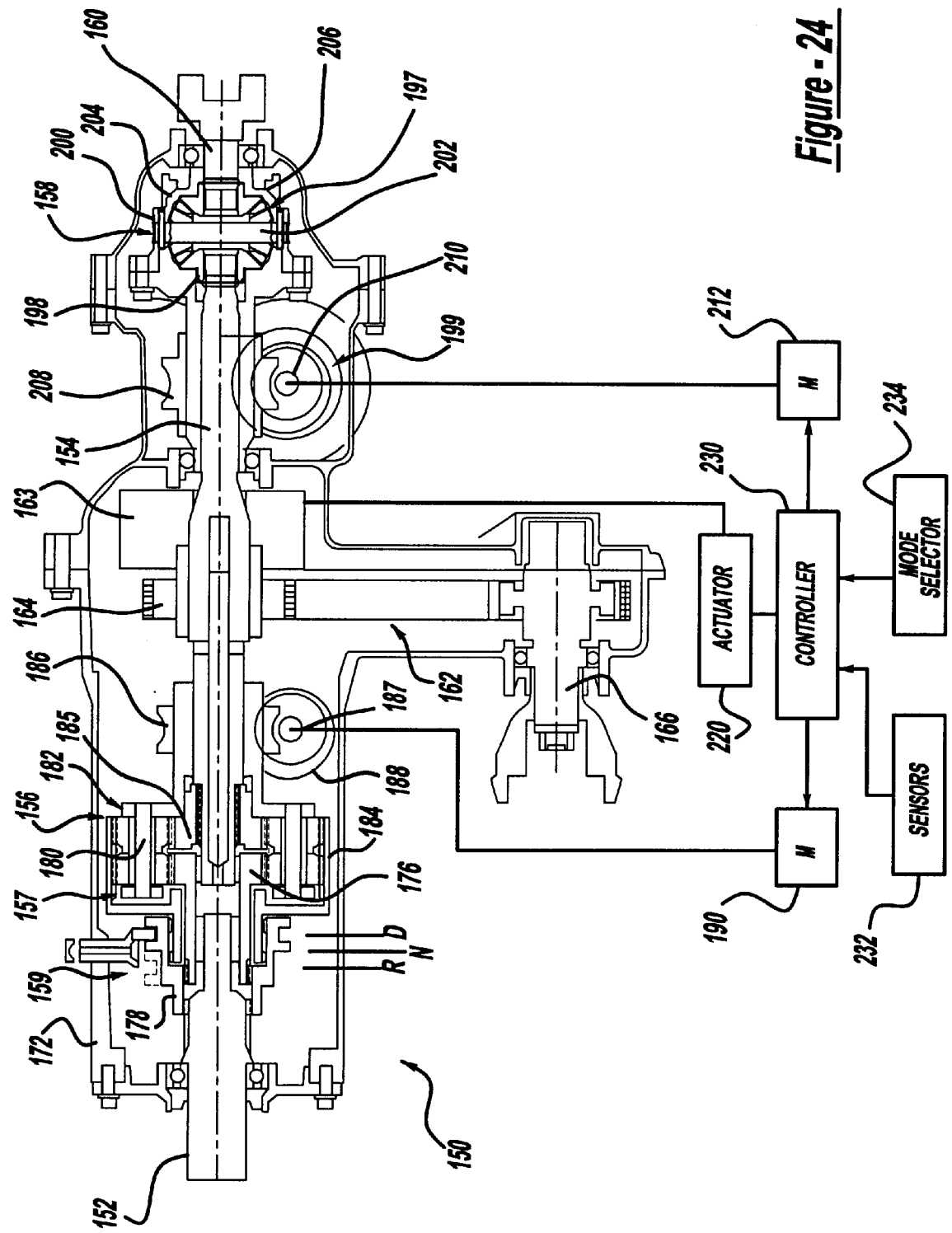
FIG. 24 is a sectional view of the continuously variable four-wheel drive transmission according to the principles of the present invention.
Figure 25:
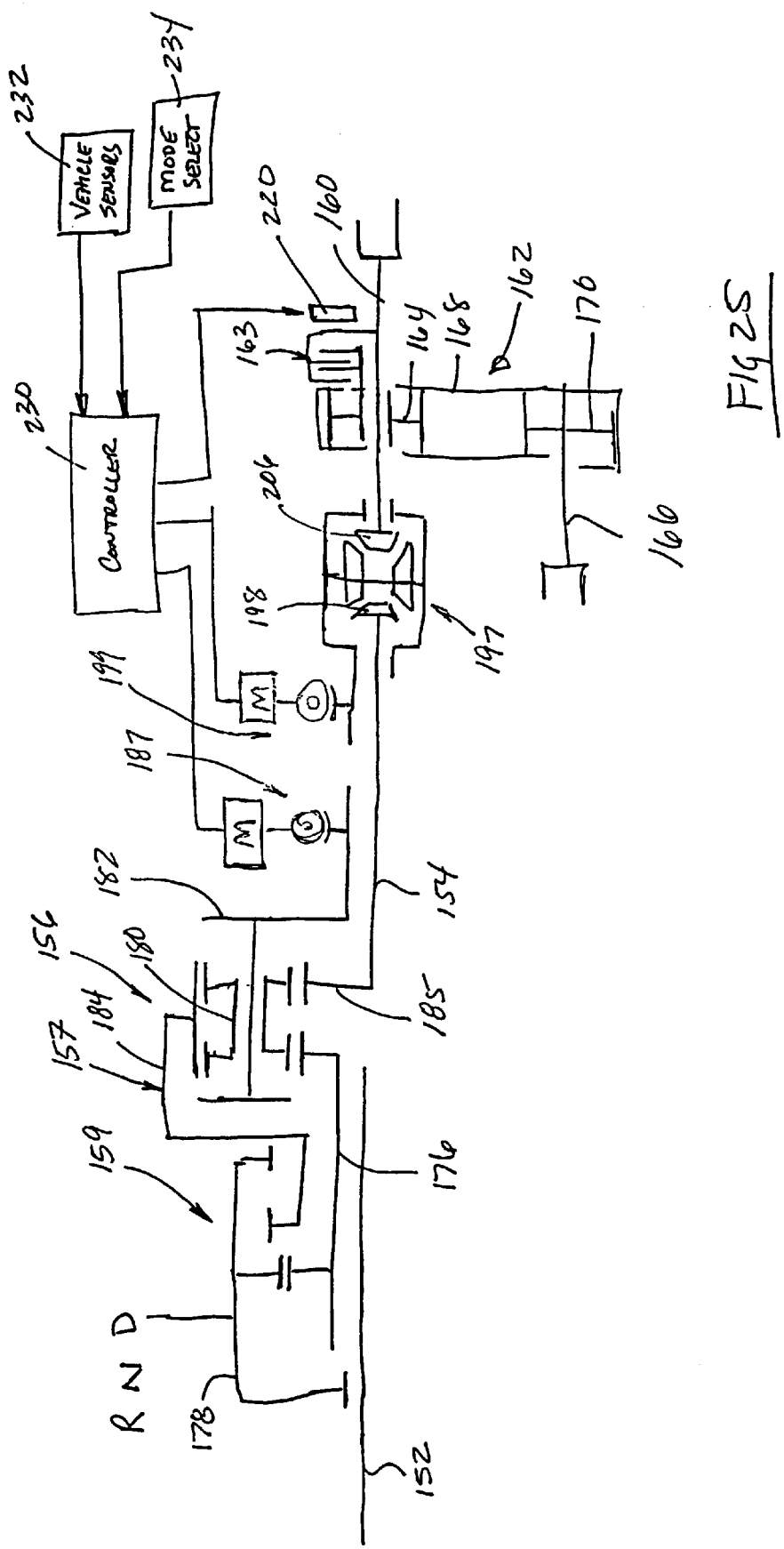
FIG. 25 is a schematic view of an alternative embodiment of the transmission shown in FIG. 24.

A continuously variable four-wheel drive transmission according to the principles of the present invention will be described below with reference to FIGS. 24 and 25. However, the following discussion relating to FIGS. 1–23 provides a detailed description of the unique enveloping-type worm/worm gear transmission which can be utilized with the present invention.

In one feature of the present invention, a worm and worm gear transmission is utilized to transmit rotation with the smallest ratio between the worm gear teeth and one worm thread. In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only 2 but is preferable larger than 15 degrees. Further detail of the use of the unique worm/worm gear transmission discussed herein can found in U.S. Pat. No. 5,992,259 entitled "Worm/Worm Gear Transmission and Apparatus for Transmitting Rotation Utilizing An Oscillating Input" and U.S. Application Ser. No. 09/290,911 filed Apr. 12, 1999 titled "Worm/Worm Gear Transmission," both of which are owned by the inventor hereof and which are also expressly incorporated by reference hereto.

Figure 1:
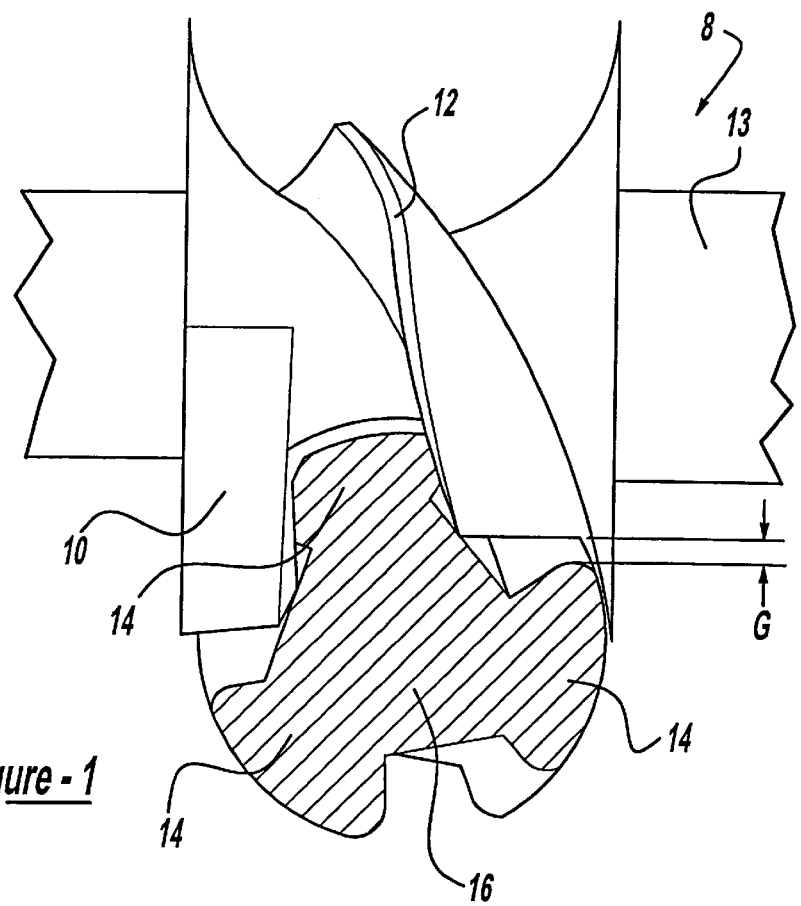
FIG. 1 is sectional view of a worm/worm gear transmission with the worm gear having three teeth according to the principles of the present invention.

Referring now to the drawings, one embodiment of a worm/worm gear transmission 8 of the present invention is illustrated in FIG. 1. Transmission 8 has an enveloping type worm 10 with at least one screw thread 12. Enveloping type worm 10 is supported on a shaft 13. Thread 12 is engaged by at least one tooth 14 of an enveloping type worm gear 16, which is shown to have three teeth 14. As shown in FIG. 1, enveloping worm 10 has a single thread 12 in a preferred embodiment and worm gear 16 has three teeth 14 spaced about its circumference. As shown, a gap "G" exists between any tooth on worm gear 16 and thread 12 on enveloping worm 10. Enveloping worm 10 wraps around enveloping worm gear 16, and enveloping worm gear 16 also wraps around enveloping worm 10.

Worm gear 16 and worm 10 are preferably enclosed in a housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown).

Figure 17:
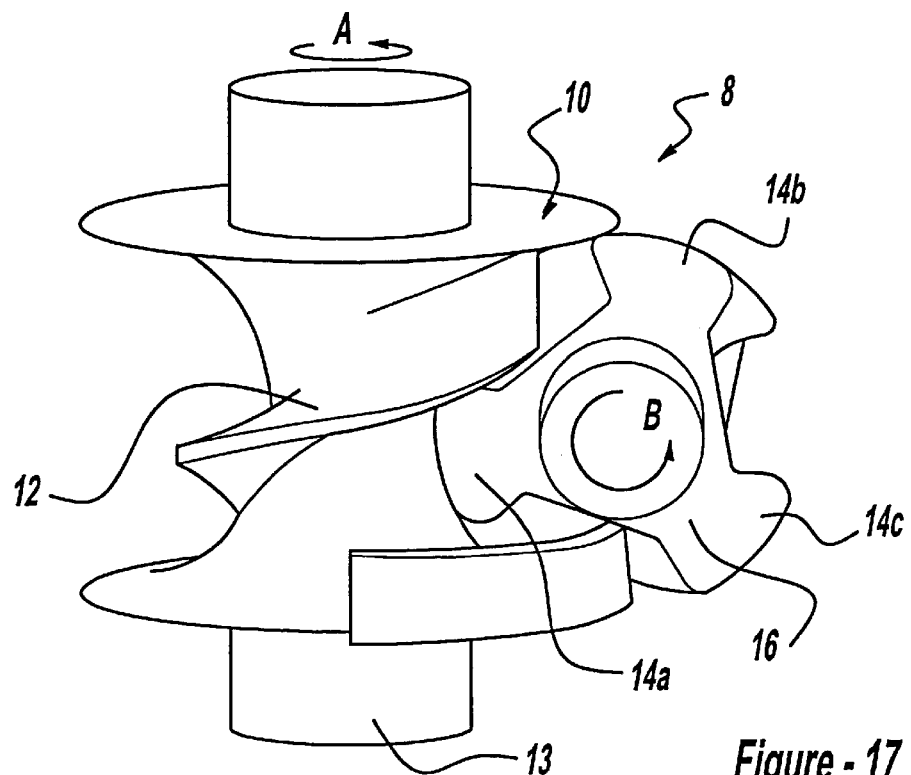
FIG. 17 is a perspective view of the worm/worm gear transmission shown in FIG. 1 with three gear teeth.

FIG. 17 is a perspective view corresponding with worm/worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 14a presses downward on tooth 14a to cause rotation of worm gear 16 in the direction of Arrow "B". As worm gear 16 rotates, gear tooth 14b then comes into engagement with thread 12 and is acted on to cause further rotation of worm gear 16 as gear tooth 14a disengages from thread 12.

Figure 2:
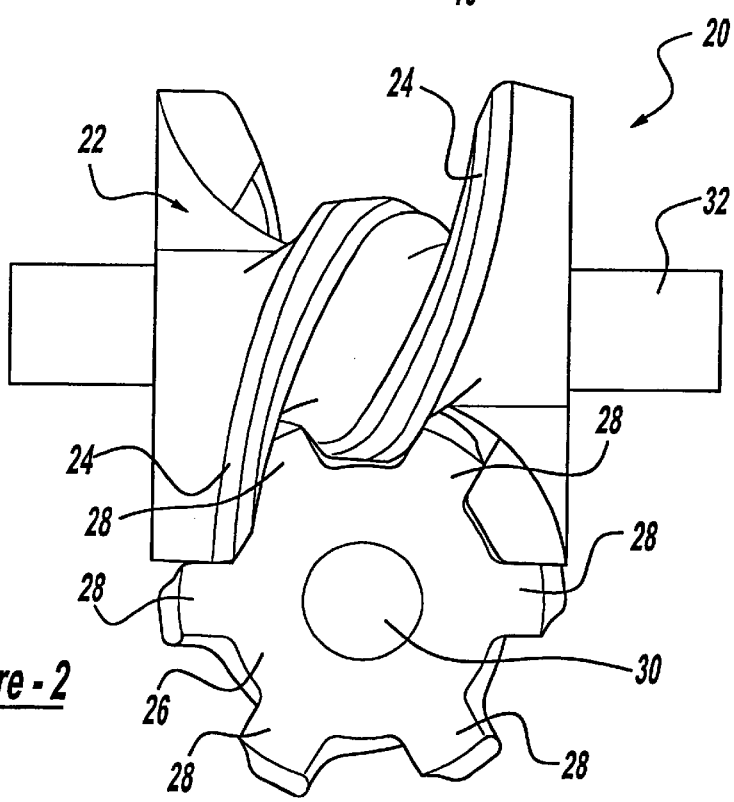
FIGS. 2 and 3 are views of a worm/worm gear transmission with the worm gear having six teeth according to the principles of the present invention.
Figure 3:
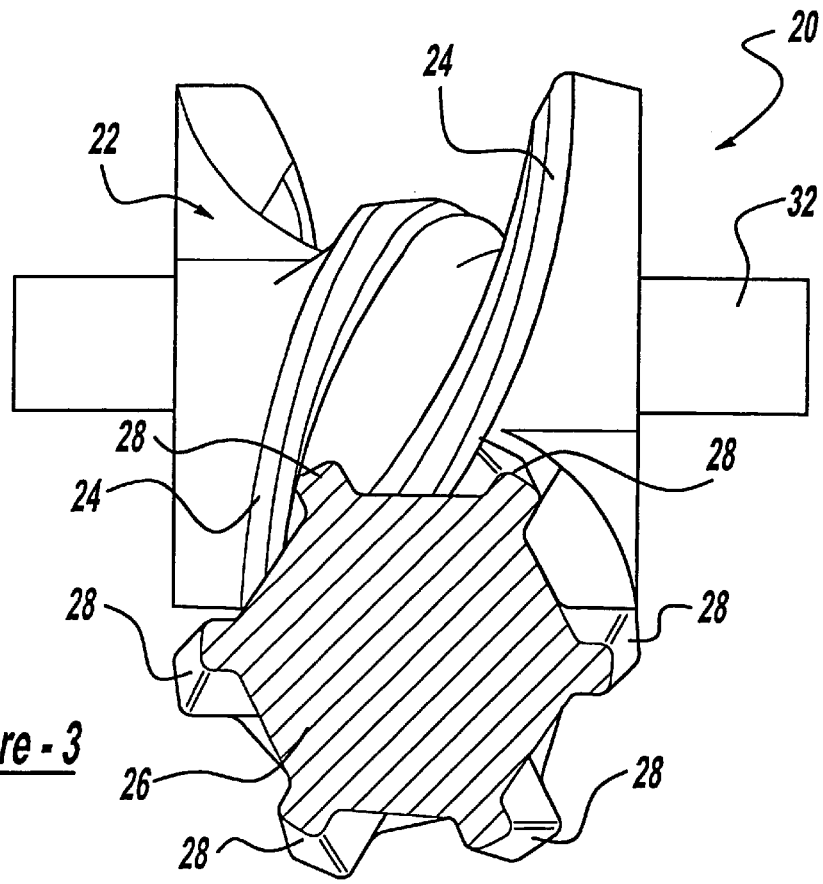
Figure 4:
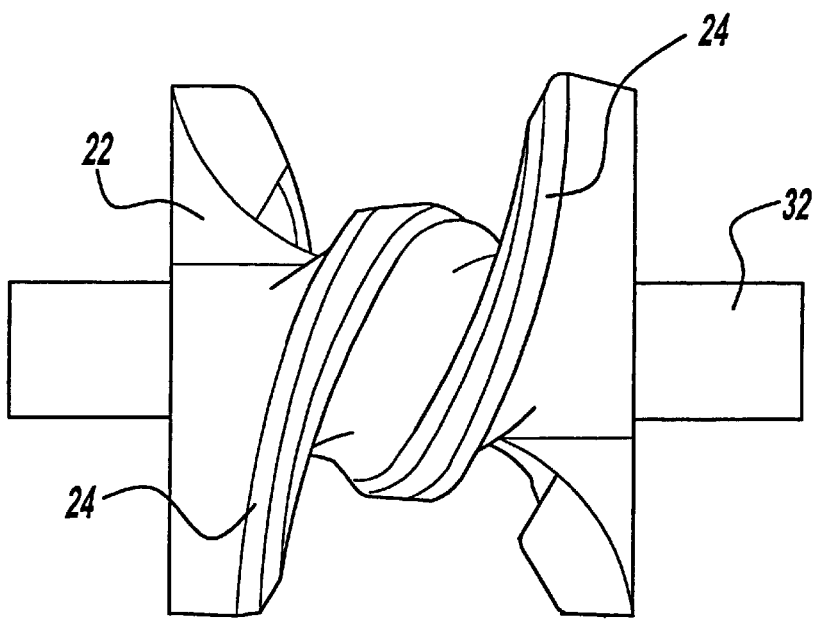
FIG. 4 is a side view of an enveloping worm having two threads.
Figure 18:
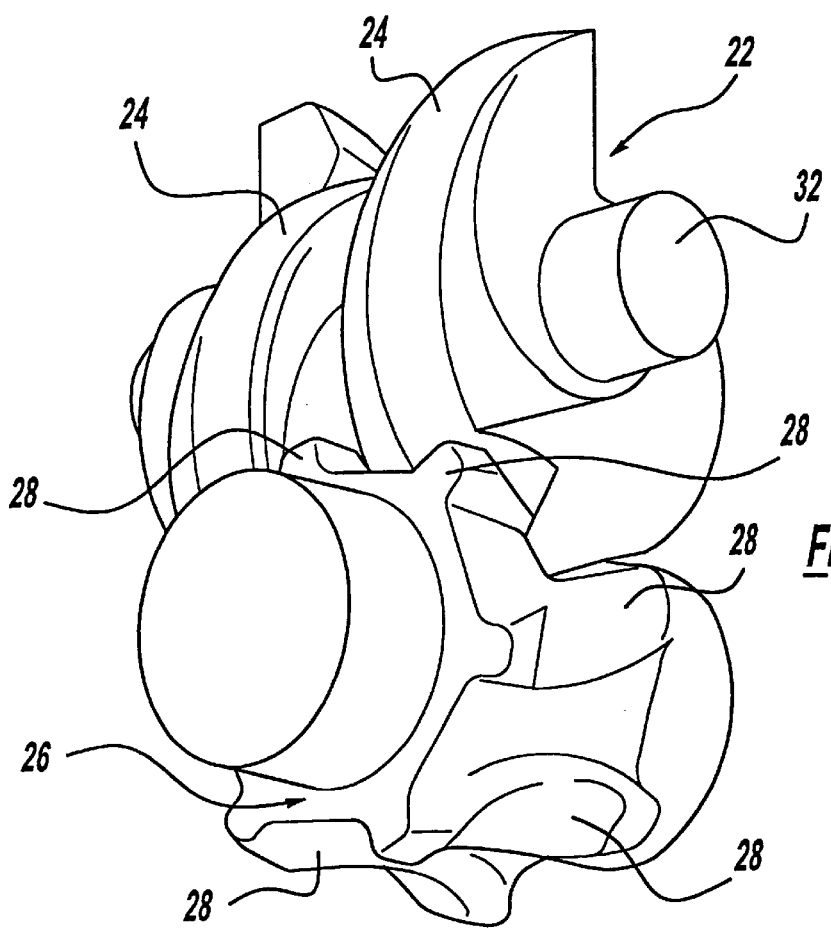
FIG. 18 is a perspective view of the worm/worm gear transmission shown in FIG. 2 with six worm gear teeth and two threads on the worm.

Another embodiment of a worm/worm gear transmission 20 of the present invention is illustrated in FIG. 2. This transmission has an enveloping-type worm 22 with two identical screw threads 24. Threads 24 are engaged by at least one tooth of an enveloping-type worm gear 26 shown to have six teeth 28. Worm gear 26 is connected to a shaft 30 while worm 22 is connected to a shaft 32. In FIG. 3, worm gear 26 is shown in cross-section. FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
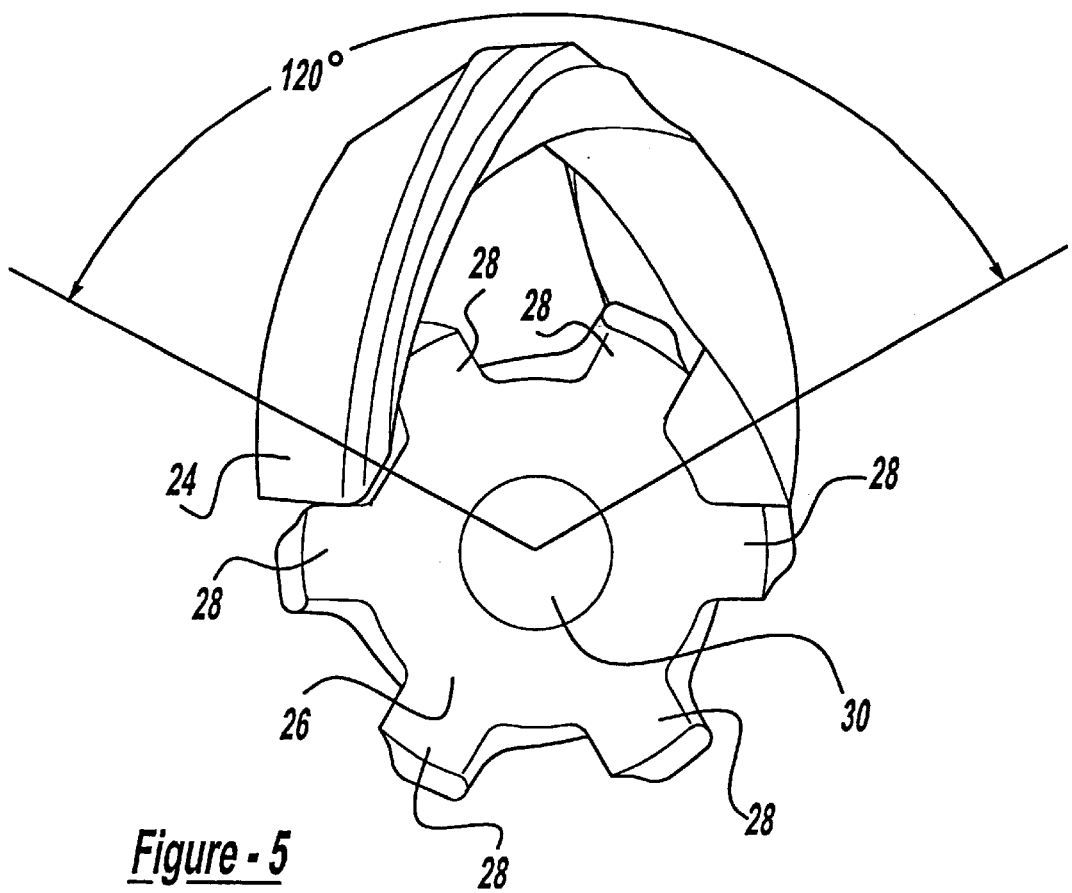
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360° around the axis of rotation for shaft 32.

Figure 21:
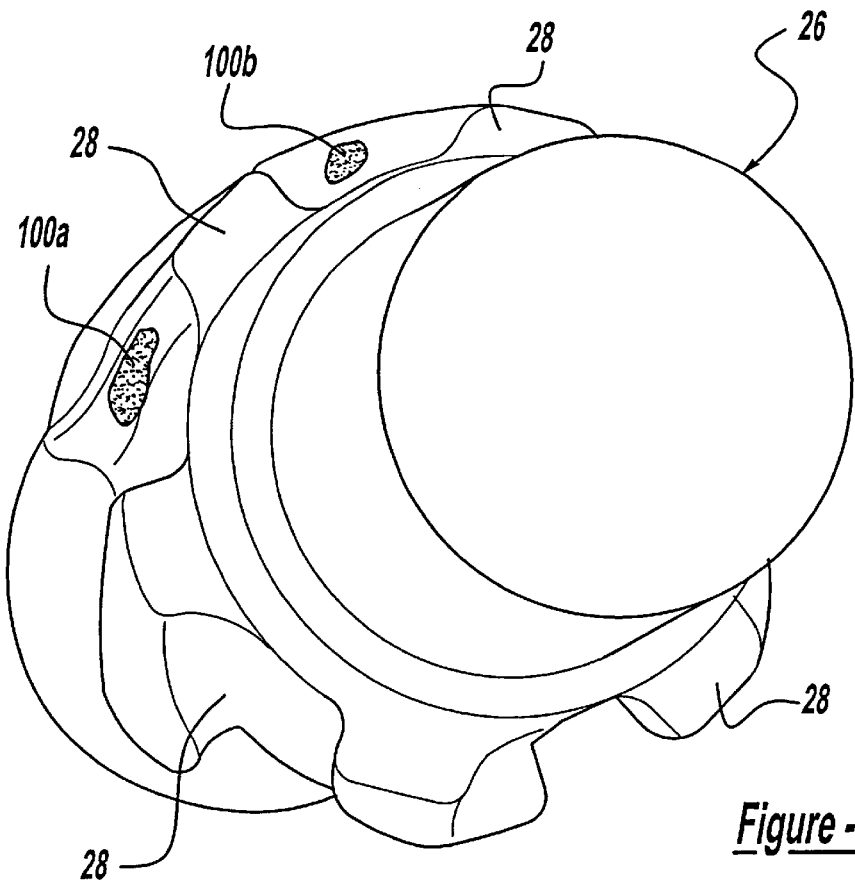
FIG. 21 is a perspective view of a worm gear with six teeth with darkened spots illustrated on the surface of the teeth to indicate the contact surface with the worm in mesh.
Figure 22:
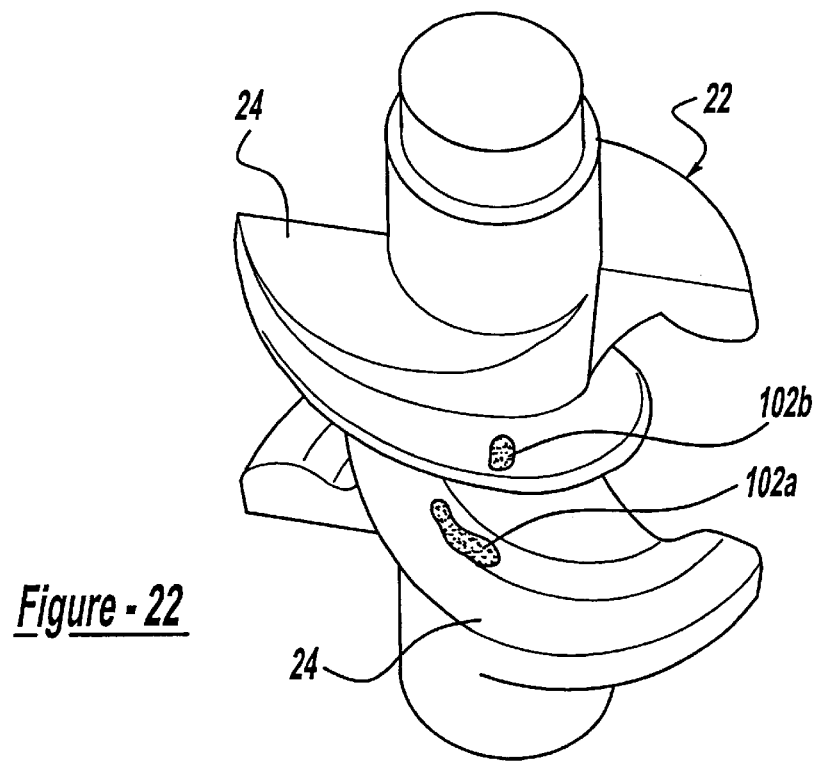
FIG. 22 is a perspective view of a worm with two threads with darkened spots illustrated on the surface thread to indicate the contact surface with the worm gear in mesh.

The enveloping worm/worm gear transmissions of the present invention provide for a worm gear having fewer than twenty-four teeth and also provides surface contact between the thread of the worm and the teeth of the worm gear as illustrated in FIGS. 21 and 22. FIG. 21 illustrates two surface contact spots 100a, 100b for a worm gear 26 having six teeth 28. FIG. 22 illustrates two corresponding surface contact spots 102a, 102b for a worm 22 with two threads 24.

Figure 6:
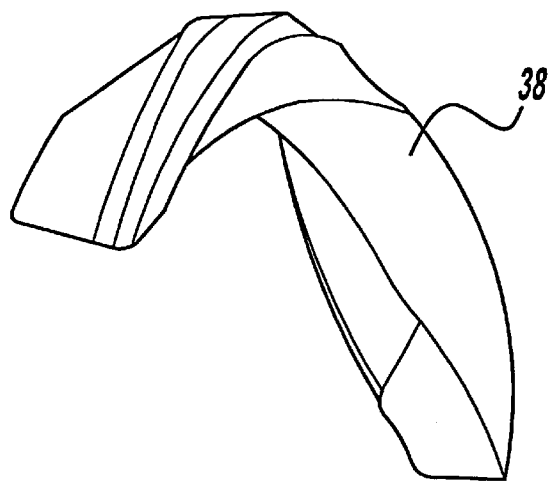
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
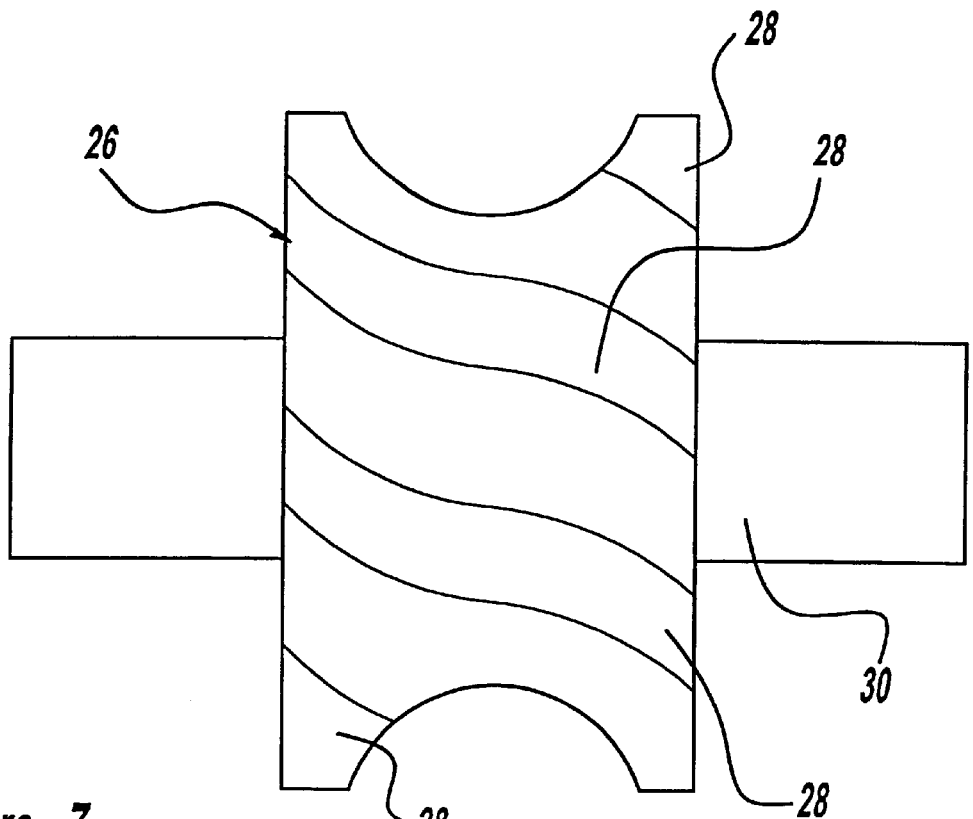
FIG. 7 shows an enveloping worm gear according to the principles of the present invention.
Figure 8:
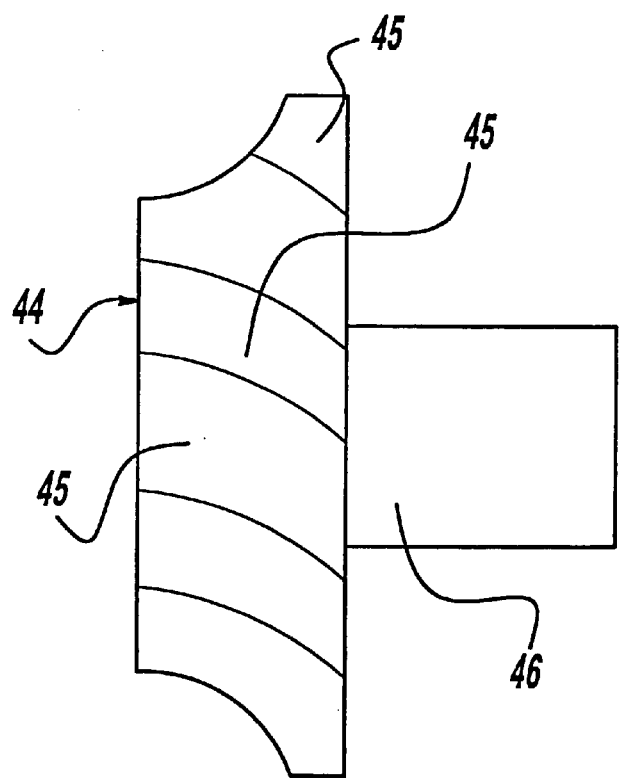
FIG. 8 shows a modified enveloping worm gear.

FIG. 7 shows a side view of enveloping worm gear 26 with six teeth 28. FIG. 8 shows an enveloping worm gear 44 having six teeth 34 which is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm or worm gear allows for disassembling the entire worm gear—collars—shaft assembly.

In the present invention, it is preferred that the ratio of the number of teeth 14 on worm gear 16 relative to the number of threads 12 on worm 10 is 11 to 1 and less. Most preferably, the ratio is three or even less, as shown. It is possible that only two teeth 14 need to be utilized on worm gear 16. The worm/worm gear transmission used in the present application could also self-lock. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
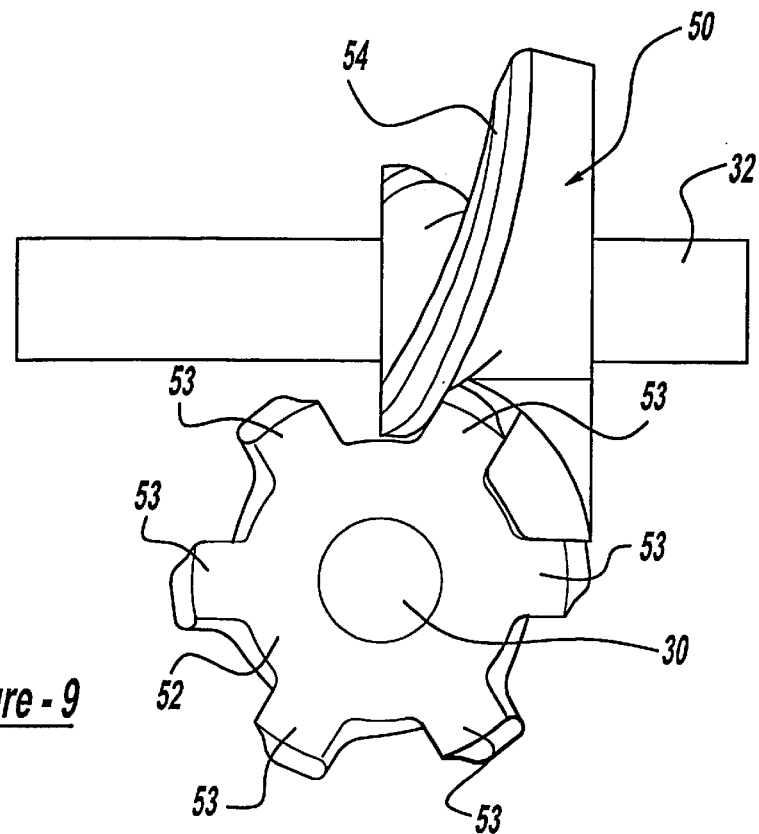
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
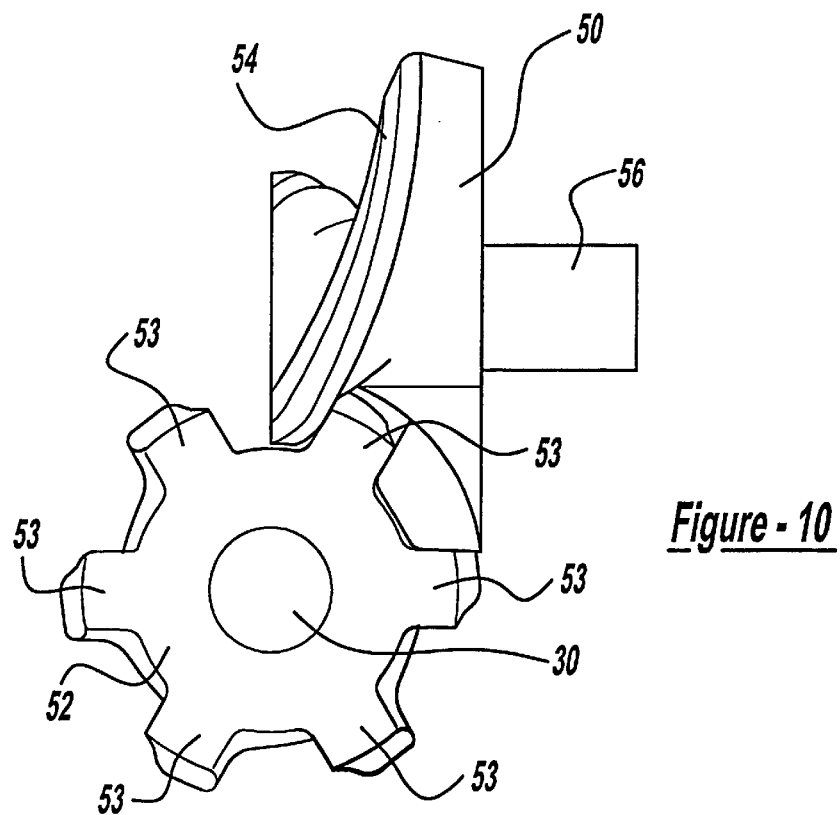
Figure 11:
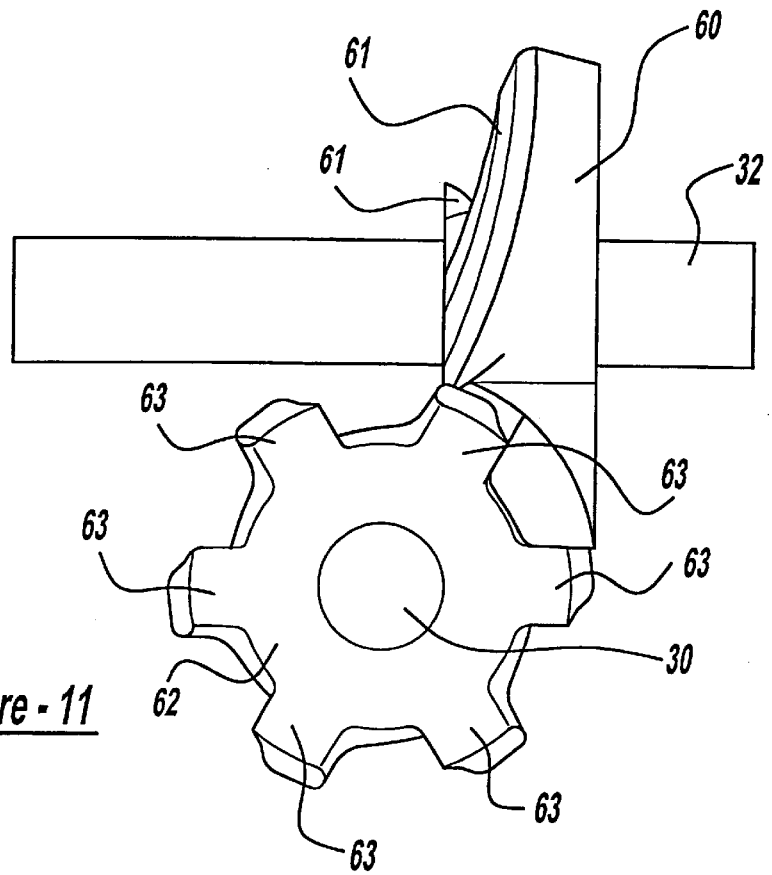
FIG. 11 shows a worm/worm gear transmission with a modified worm in an off-center position.
Figure 12:
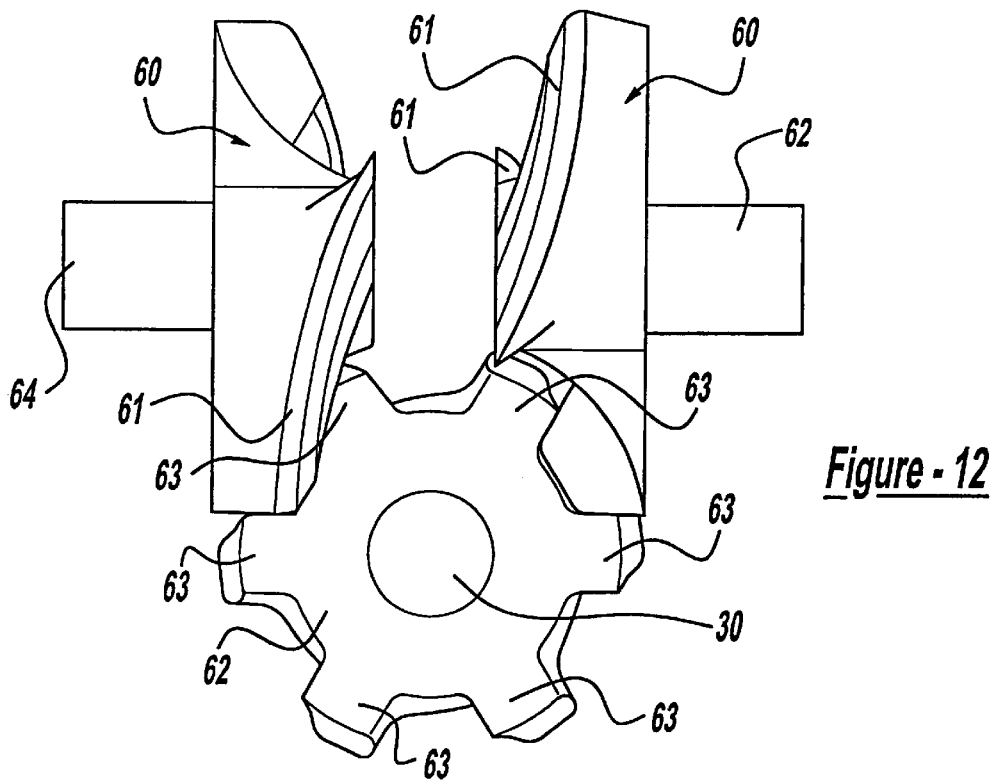
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

Figure 13:
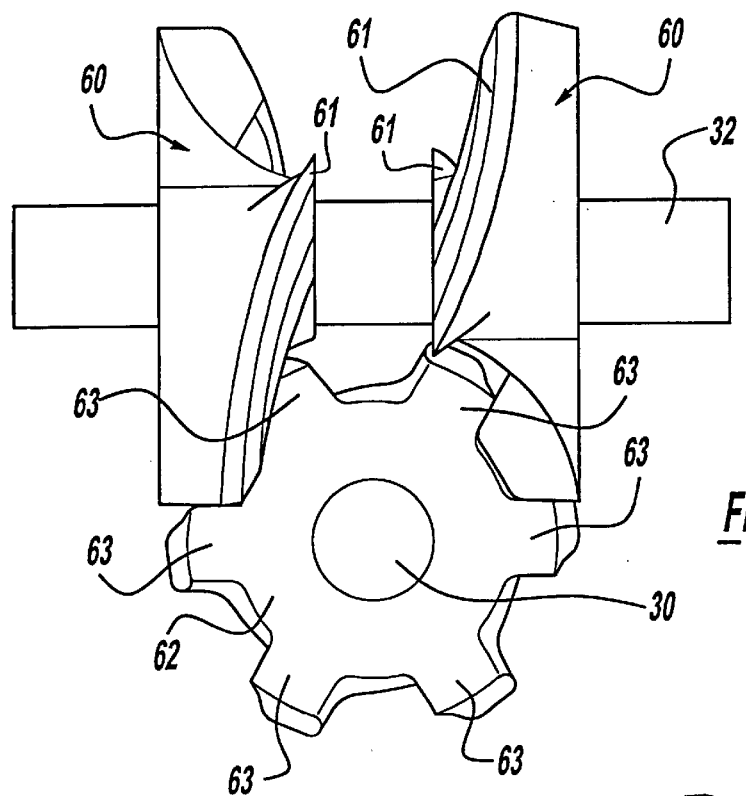
FIG. 13 shows a worm/worm gear transmission with two modified worms aligned on the same axis of rotation and connected to a common shaft.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

Figure 14:
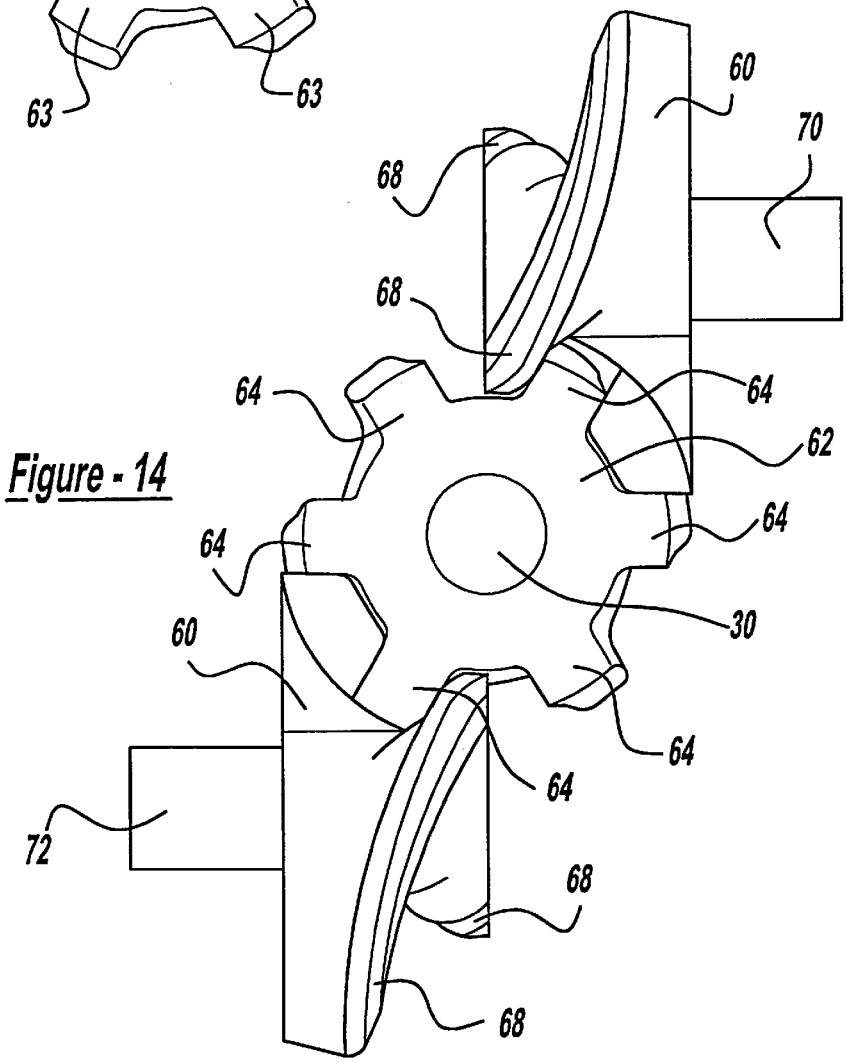
FIG. 14 shows a worm/worm gear transmission with two modified worms located on different axis of rotation.

FIG. 14 shows a view of a worm/worm gear transmission with two modified worms 60 having worm threads 68 each placed on different axes of rotation and connected to different drive shafts 70 and 72. Each of worms 60 meshingly engages the worm gear 62 having teeth 64.

Figure 15:
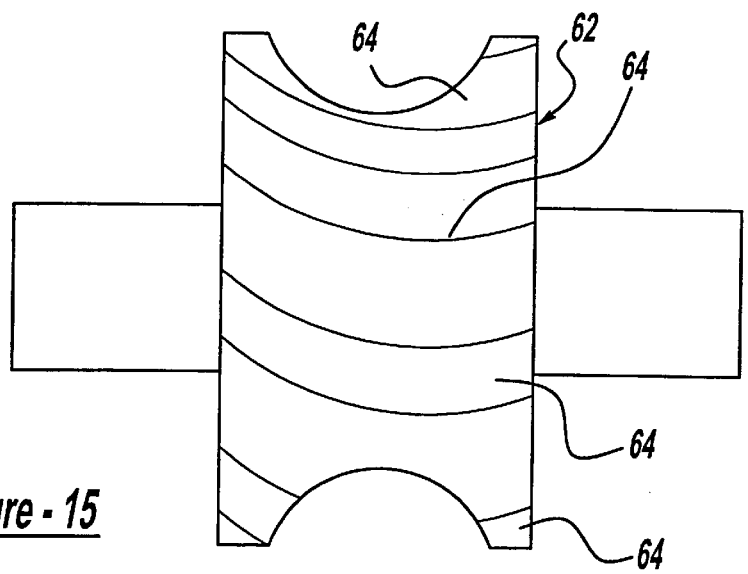
FIG. 15 shows an enveloping worm gear with a different tooth profile.

FIG. 15 shows a side view of an enveloping worm gear 62 with teeth 64 have a different profile which is generated by enveloping thread 68 of worm 60 as shown in FIG. 14.

Figure 16:
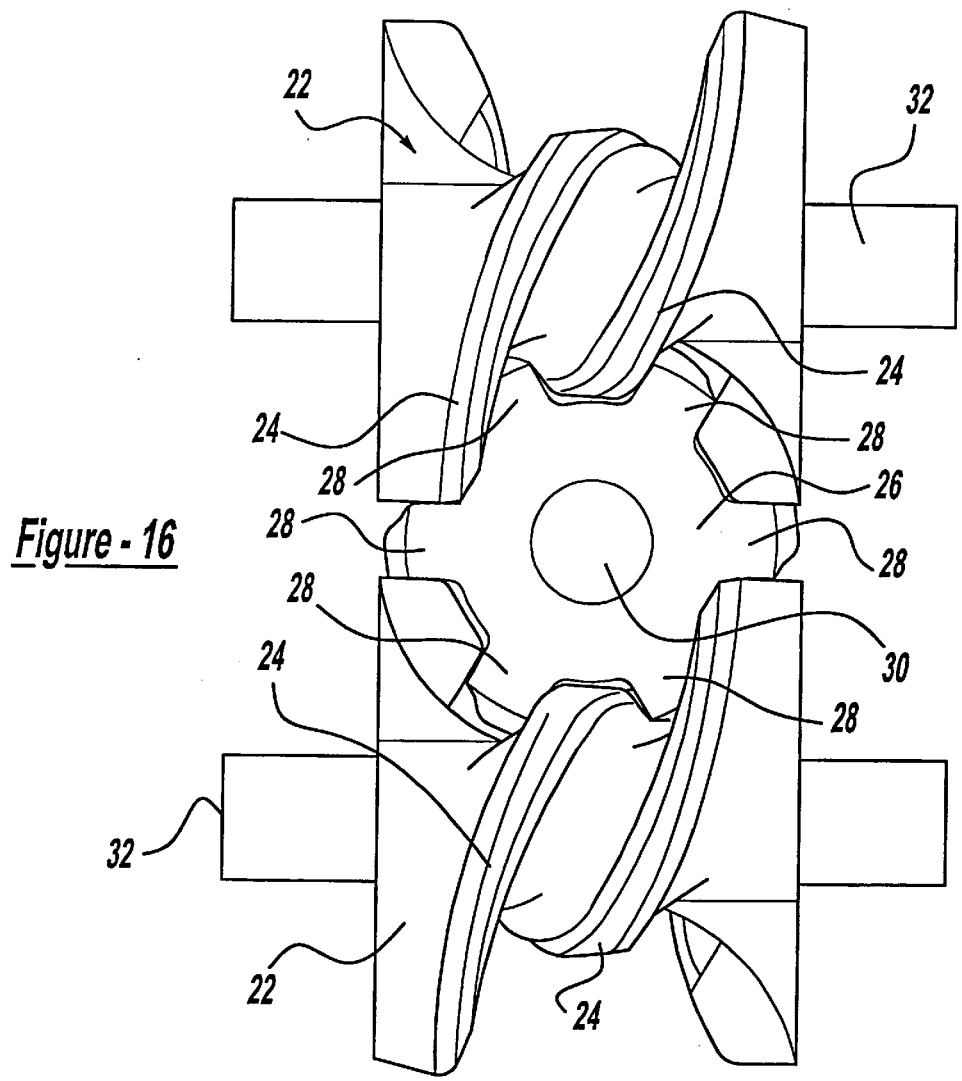
FIG. 16 shows a worm/worm gear transmission with two enveloping worms placed on different axes of rotation.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26.

Figure 19:
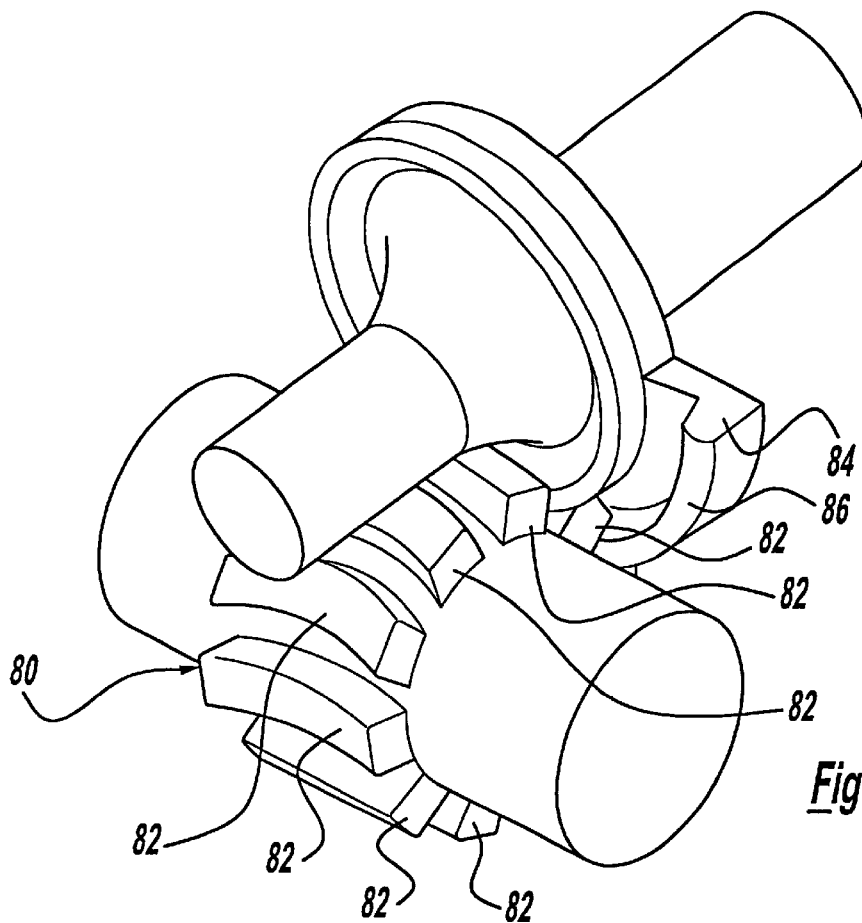
FIG. 19 is a perspective view of a worm/worm gear transmission with ten worm gear teeth and with single thread worm.

FIG. 19 is a perspective view of a worm/worm gear transmission including worm gear 80 having ten teeth 82 in mesh with an enveloping split worm 84 including a thread 86.

Figure 20:
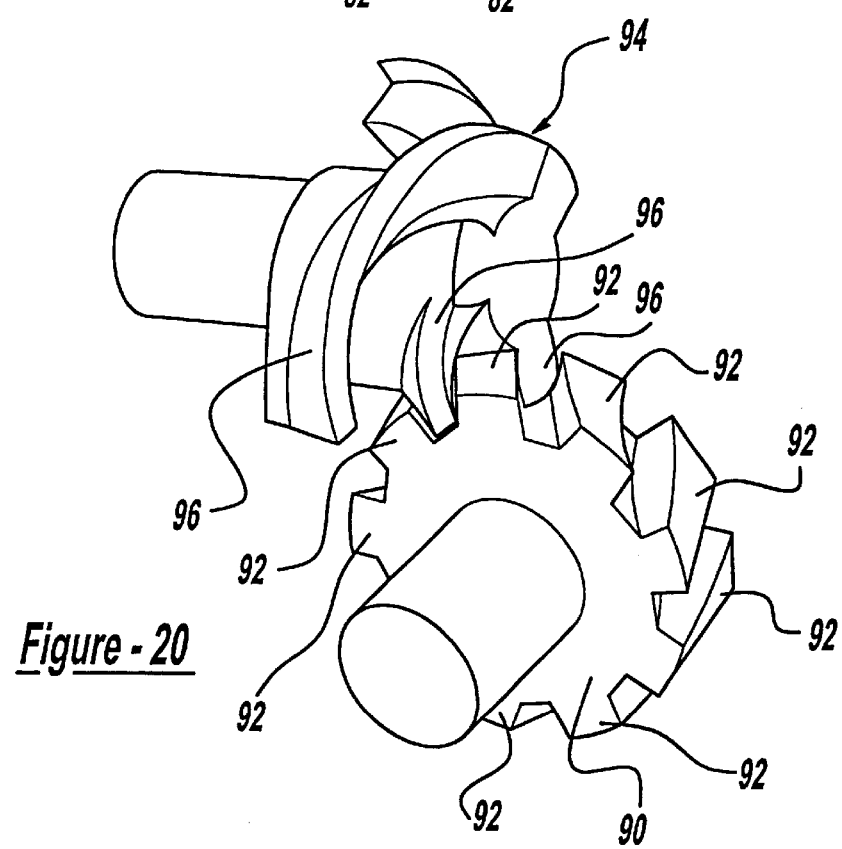
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

Figure 23:
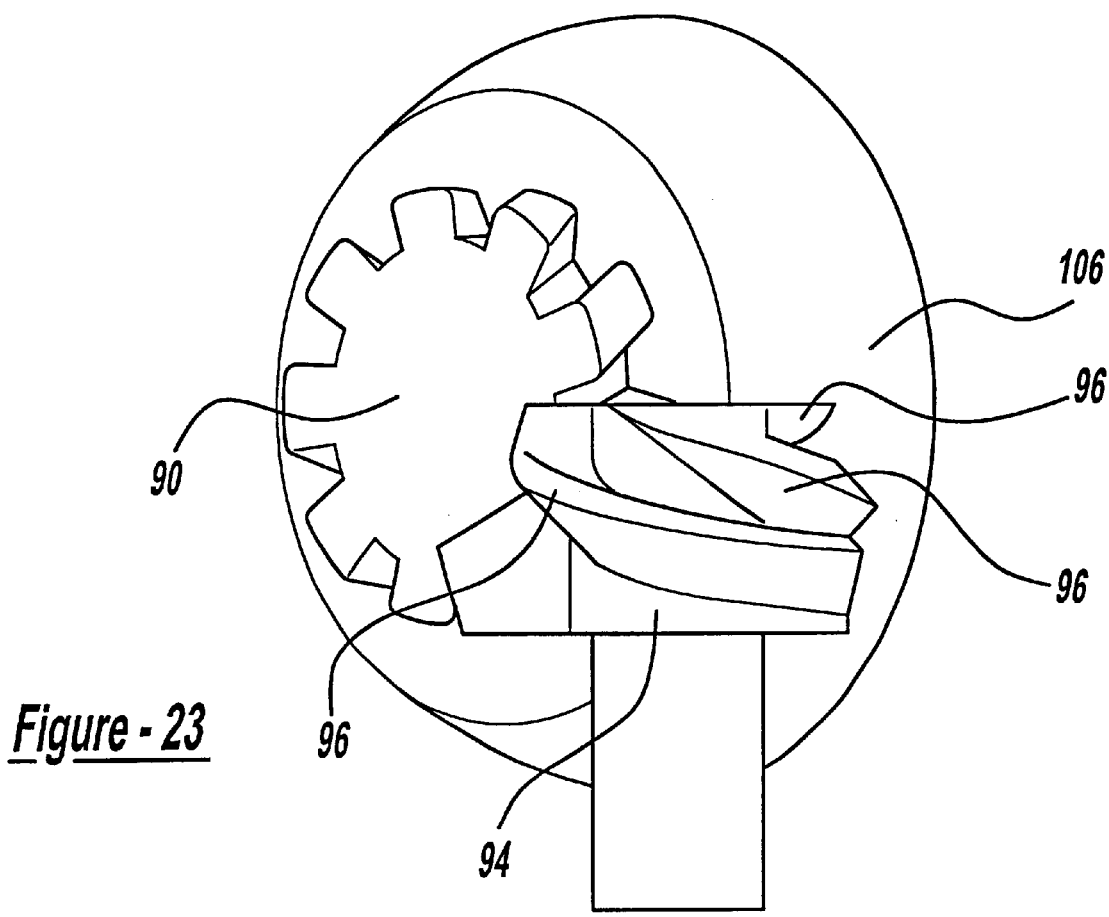
FIG. 23 illustrates the size difference of the worm/worm gear transmission of FIG. 20 in comparison to the size of a typical hypoid gear.

FIG. 23 illustrates the size difference of a worm/worm gear transmission as shown in FIG. 20 in comparison with the size of a typical hypoid gear 106.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown.

Alternatively, when the worm/worm gear transmission does include the self-lock feature, rotary motion can be provided only from the drive shaft to the enveloping worm and through the enveloping type worm gear to the output shaft. Thus, the worm/worm gear transmissions shown in FIGS. 12, 14 and 16, with independent drive shafts connected to the worms, could be used in a split-power transmission, such as that of a helicopter drive, to transmit energy from a high-speed engine to a rotor drive shaft. In this case, the worm gear could be connected directly (or by a geartrain) to the helicopter rotor drive shaft, and worms could be connected to the output of the helicopter engine directly (or by a geartrain). In some designs of helicopter power train, the worm/worm gear transmission of the present invention could replace bevel gears.

In the present invention, a self-locking worm/worm gear combination can have a worm gear to worm thread ratio that is preferably 10 and less. Such a system is desirable so that each one of the worm and worm gear combinations described above can transmit very high torque loads when compared to prior systems.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

In the present application, it is surface-to-surface contact between the worm gear teeth and the worm thread that increases the torque capacity of the enveloping worm/worm gear transmission. This became possible when the enveloping angle of the worm thread for generation of the worm gear teeth is more than 15 degrees, or even 30 degrees. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

It was confirmed by testing of a steel worm/worm gear transmission constructed according to the present invention that such transmissions can replace hypoid or bevel gearing in many applications. The lower noise of the worm/worm gear transmission compared with hypoid and bevel gear transmissions make using the worm/worm gear transmission of the present invention more beneficial, in particular, in helicopter or in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission. Assuming the modified worm 94 is the same size as the pinion of a hypoid gear set, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications.

The basic inventive system of the present invention can be reconfigured into many different mechanical transmissions. For example, it can be used in a front axle drive and differential drive rear axle of a car, power windows, escalator drive and more.

In general, four-wheel drive transmission 150 includes an input shaft 152, and intermediate shaft 154, a continuously variable transmission unit (CVT) 156 operably disposed between input shaft 152 and intermediate shaft 154, a rear output shaft 160, a continuously variable range unit (CVR) 158 operably disposed between intermediate shaft 154 and rear output shaft 160, a front output shaft 166, and a torque transfer unit 162 operably disposed between intermediate shaft 154 and front output shaft 166. Torque transfer unit includes a coupling 163, a first sprocket 164 rotatably supported on intermediate shaft 154 and adapted to selectively/automatically receive torque from intermediate shaft 154 via actuation of coupling 163, a second sprocket 170 fixed to front output shaft 166, and a chain 168 connecting sprockets 164 and 170. Four-Wheel drive transmission 150 also includes a housing 172 which supports input shaft 152, intermediate shaft 154, and front and rear output shafts 166, 160 for rotation.

CVT 156 includes a differential 157 and a mode shift mechanism 159. Differential 157 could be selected from many known differential units such as a planetary or bevel gear differential. In the specific embodiment shown, an epicyclic differential is provided. Epicyclic differential 157 includes a first sun gear 176 which can be selectively engaged and disengaged from input shaft 152 by a lock collar 178 associated with mode shift mechanism 159. First sun gear 176 is meshingly engaged with a plurality of double planetary pinions 180 which are rotatably supported on a carrier 182 and furthermore meshingly engage a bell-shaped reverse annulus gear 184. Double planetary pinions 180 also engage a second sun gear 185 which is rotatably supported on intermediate shaft 154.

CVT 156 further includes a first drive mechanism 187 comprised of a worm/worm gear transmission and a power-operated drive unit. Specifically, a tubular extension of planetary carrier 182 is rotatably supported on intermediate shaft 154 and has an enveloping worm gear 186 fixed thereto. The thread(s) of an enveloping worm 188 are in meshing engagement with the teeth of enveloping worm gear 186. Worm 188 is selectively driven by an electric motor 190. Enveloping worm 188 and worm gear 186 define a worm/worm gear transmission preferably of the type described above wherein the gear ratio is low. Specifically, it is desirable that enveloping worm gear 186 have fewer than twenty-four teeth.

As noted, mode shift mechanism 159 includes lock collar 178 which is axially movable by a bell crank mechanism 192. Lock collar 178 is splined for rotation with input shaft 152 and includes first clutch teeth selectively engagable with clutch teeth on first sun gear 176 and second clutch teeth on reverse annulus gear 184. When lock collar 178 is in the far right DRIVE (D) position, as shown in FIG. 24, lock collar 178 provides a driving connection between input shaft 152 and first sun gear 176. This provides a forward operation mode for CVT 156. Specifically, as input shaft 152 provides torque through lock collar 178 to first sun gear 176, first sun gear 176 drives double planetary pinion gears 180. Assuming that electric motor 190 is turned off and enveloping worm 188 and enveloping worm gear 186 are self-locking and therefore held stationary, planetary carrier 182 is prevented from rotating. Thus, as first sun gear 176 drives double planetary pinions 180, with carrier 182 fixed, second sun gear 185 is then rotated for thereby transmitting torque to intermediate shaft 154 in a one-to-one drive relationship (i.e. direct drive).

In order to provide variable ratio drive, the speed of intermediate shaft 154 must be varied relative to input shaft 152. To accomplish this, first drive mechanism 187 is activated such that enveloping worm 188 and enveloping worm gear 186 are driven in order to rotatably drive carrier 182. Epicyclic differential 157 will then provide an output to second sun gear 185 which is a function of both the speed of input shaft 152 and the driven speed of carrier 182. With the above described arrangement, variable speeds can be obtained by varying the speed of electric motor 190.

As intermediate shaft 154 is driven, it provides an input to CVR 158 via a first side gear 198. CVR 158 includes a differential 197 and a second drive mechanism 199. Differential 197 includes a carrier housing 200 which supports a pinion shaft 202 therein. A pair of pinion gears 204 are rotatably mounted on pinion shaft 202 and a second side gear 206 is provided in meshing engagement with pinion gears 204 and is fixably mounted to rear output shaft 160. Drive mechanism 199 includes a worm/worm gear transmission which is operable to vary the rotational speed of carrier 200. Specifically, carrier 200 has an enveloping worm gear 208 mounted thereon which is in meshed engagement with an enveloping worm 210. Enveloping worm 210 is operatively driven by a second electric motor 212. Enveloping worm gear 208 and enveloping worm 210 are preferably of the type described above. In particular, it is desirable that the ratio of the number of gear teeth on worm gear 208 relative to the number of threads on worm 210 is low. Preferably, the number of teeth on worm gear 208 is less than twenty-four.

Enveloping worm 210 and enveloping worm gear 208 in combination with differential 197 are capable of varying the output from intermediate shaft 154 to rear output shaft 160. In particular, as intermediate shaft 154 drives first side gear 198 of differential unit 197 if worm 210 and worm gear 208 remain stationary, under the self-lock principles (as described above), side gear 198 drives pinion gears 204 which, in turn, drive second side gear 206 at the same speed as rotation of the first side gear 198 so that there is a direct drive (high-range) relationship between intermediate shaft 154 and rear output shaft 160. However, if second electric motor 212 is operated in order to drive worm 210 for rotating worm gear 208 and carrier 200, the speed of rotation of intermediate shaft 154 can either be increased or decreased depending on the direction of rotation of worm 210 and worm gear 208 so that rotation of rear output shaft 154 dependent upon the speed and direction of rotation of second electric motor 212.

Coupling 163 can be of any known type in order to provide two-wheel drive to four-wheel drive control. Known torque transfer couplings 163 include a viscous coupling or a pump-type speed differential coupling which are well known from commonly assigned U.S. Pat. Nos. 5,597,369 and 5,704,863 which are herein incorporated by reference. In addition, known active torque transfer couplings include an electromagnetic clutch coupling which is automatically controlled based upon sensor based inputs which detect a rotational different in the front and rear wheel drives as is well known from commonly assigned U.S. Pat. Nos. 5,215, 160 and 5,275,253 which are herein incorporated by reference. In addition, adaptively activated clutch pack clutches can also be utilized as active torque transfer couplings as is well known from commonly assigned U.S. Pat. No. 5,704, 867 which is herein incorporated by reference.

Torque transfer coupling 163 supplies torque from intermediate shaft 154 to drive sprocket 164 which, in turn, delivers torque to driven sprocket 170 via chain 168. It should be understood that other known torque delivery systems such as a pulley and belt or a gear train can be utilized for providing torque between intermediate shaft 154 and front output shaft 166. For purposes of example, coupling 163 is a mutli-plate clutch having an actuator 220 that can be actuated to modulate the clutch engagement force across the clutch, thereby modulating the torque transferred to front output shaft 166.

Transmission 150 further includes a transmission controller 230 which is operable to control actuation of motors 190 and 212, and actuator 220. Input signals are delivered to controller from various sensors, identified by block 232, and which are used by controller to adaptively control torque transfer between input shaft 152 and output shafts 160 and 166. Contemplated input signals include the, among others, rotary speed of all the shafts, brake actuation status, throttle position and steering angle.

Transmission 150 described above is capable of providing "active" traction control for the front and rear propshafts. Because of the ability of CVT 156 to vary the speed of rotation of intermediate shaft 154 from input shaft 152, no engine clutch is required in order to provide torque from input shaft 152 to intermediate shaft 154. The system as described is provided with a discrete neutral position via the movement of lock collar 178 to a centered NEUTRAL (N) position where torque is not transmitted to reverse annulus gear 184 or to first sun gear 176. When lock collar 178 is moved to the far left REVERSE (R) position, it provides a driving connection between input shaft 152 and reverse annulus 184. As reverse annulus gear 184 is rotated in connection with input shaft 152, reverse annulus gear 184 drives double planetary pinions 180 relative to planetary carrier 182 which is fixed when first electric motor 190 is turned off. Via rotation of double planetary pinions 180, second sun gear 185 is driven in a direction opposite to the rotation of input shaft 152 and therefore provides a reverse rotation of intermediate shaft 154 in order to provide a reverse operation of transmission 150. Via driving of worm 188 and worm gear 186 in order to drive carrier 182, transmission 150 of the present invention is also provided with a geared neutral operation mode. In particular, as carrier 182 of differential unit 157 is driven at an appropriate speed, the output of differential unit 157 to second sun gear 185 can become zero.

The integrated transmission and transfer case of the present invention provides active traction control to the rear prop shaft in a two-wheel drive mode as well as providing active traction control to the front and rear propshafts in four-wheel drive mode. Referring to FIG. 25, a modified arrangement is shown for transmission 150. Specifically, most components are identical to transmission 150 with the exception that torque transfer unit 162 is located on rear output shaft 160 instead of on intermediate shaft 154.

Several embodiments of the present invention have been disclosed. A worker of ordinary skill in the art would recognize that certain modifications would come within the scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. transmission for a four-wheel drive vehicle including an engine and front and rear drivelines, comprising:
    an input shaft driven by the engine;
    an intermediate shaft;
    a continuously variable transmission unit operably coupled said input shaft to said intermediate shaft and including a first differential and a first drive mechanism, said first differential having a first component driven by said input shaft, a second component driving said intermediate shaft, and a third component, said first drive mechanism includes a first worm gear fixed to said third component, a first worm meshed with said first worm gear, and a first motor for driving said first worm;
    a rear output shaft adapted to be coupled to the rear driveline;
    a continuously variable range unit operably coupling said intermediate shaft to said rear output shaft and including a second differential and a second drive mechanism, said second differential having a first component driven by said intermediate shaft, a second component driving said rear output shaft, and third component, said second drive mechanism includes a second worm gear fixed to said third component, a second worm meshed with said second worm gear, and a second motor for driving said second worm;
    a front output shaft adapted to be coupled to the front driveline; and
    a torque transfer coupling for transferring drive torque from one of said intermediate shaft and said rear output shaft to said front output shaft to establish a four-wheel drive mode.

2. The transmission according to claim 1, further comprising a controller for automatically controlling variable actuation of said first and second motors in response to sensor input signals provided by sensors.

3. The transmission according to claim 2 further comprising a mechanism for establishing forward and reverse drive connections between said input shaft and said intermediate shaft.

4. The transmission according to claim 2 wherein said first differential includes said first component being a first sun gear, an annulus gear, said second component being a second sun gear fixed to said intermediate shaft, and said third component being a carrier supporting pinion gears meshed with said first and second sun gears and said annulus gear, one of said first sun gear and said annulus gear being selectively coupled to said input shaft via movement of a sliding clutch sleeve to respectively establish forward and reverse drive connections with intermediate shaft.

* * * * *